Jan. 6, 1925.
G. G. NEISH
DEMOUNTABLE RIM
Filed April 19, 1923
1,522,317
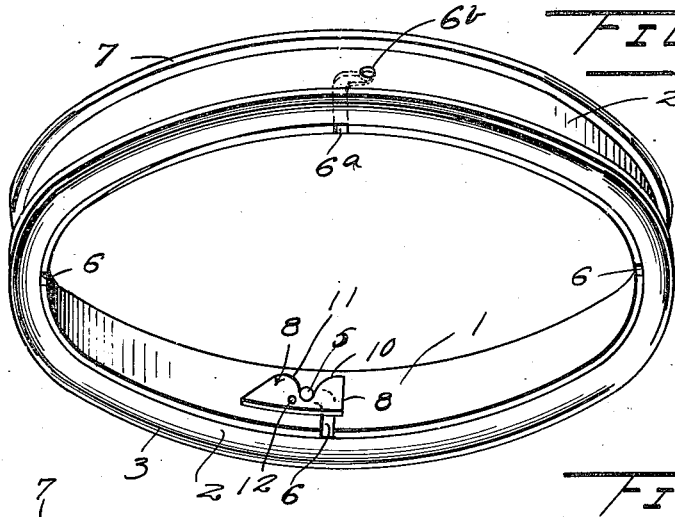
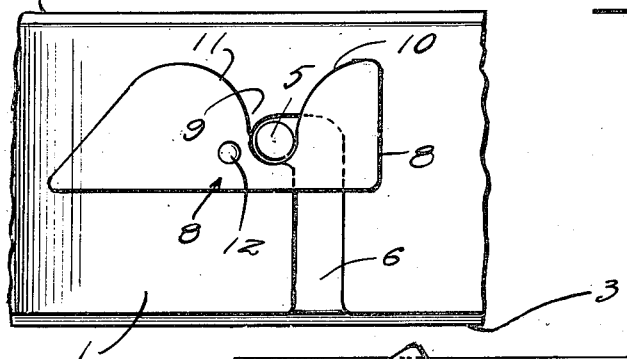
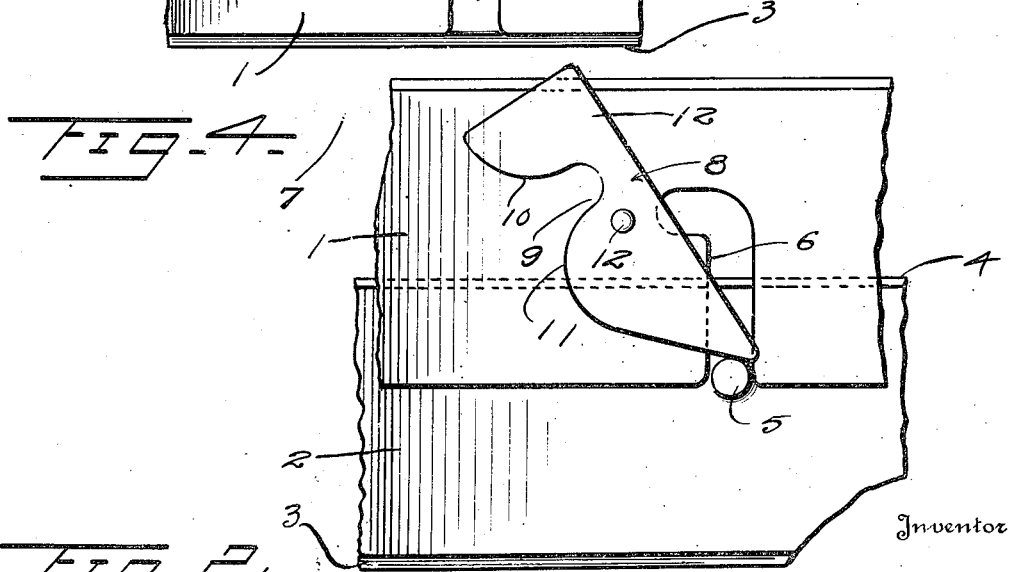
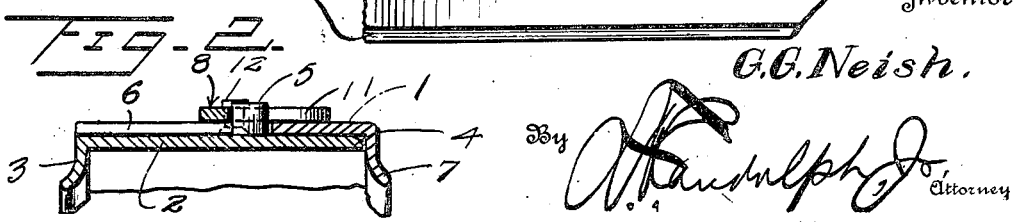
Inventor
G.G. Neish.
By
Attorney Patented Jan. 6, 1925.

1,522,317

UNITED STATES PATENT OFFICE.

GEORGE G. NEISH, OF McGREGOR, COLORADO.

DEMOUNTABLE RIM.

Application filed April 19, 1923. Serial No. 633,171.

*To all whom it may concern:*

Be it known that I, GEORGE G. NEISH, a citizen of the United States, residing at McGregor, in the county of Routt and State of Colorado, have invented certain new and useful Improvements in Demountable Rims; and I do hereby declare the following to be a full, clear, and exact description of the invention, such as will enable others skilled in the art to which it appertains to make and use the same.

The invention has for its object to provide a rim for the wheel of an automobile or other motor vehicle which will enable a pneumatic tire to be easily and quickly mounted and dismounted without requiring the use of ordinary tire tools so that a tire may be changed on the road with the greatest facility and ease.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application:

Figure 1 is a perspective view of a demountable rim embodying the invention, the members comprising the same being assembled, Figure 2 is a sectional view of a portion of the rim with the members assembled, Figure 3 is a detail view of a portion of the rim as seen from the inner side, the locking dog being in operative position, and Figure 4 is a view similar to Figure 3, the locking dog being turned aside to admit of the members comprising the rim being separated.

Corresponding and like parts are referred to in the following description and designated in the several views of the drawings by like reference characters.

The rim comprises complemental annular members or rings having concentric arrangement and cooperating locking means to secure the same when assembled. The numeral 1 designates the inner member or ring and the numeral 2 the outer member or ring. The member 2 has an outer flange 3 at one side and its opposite side beveled as indicated at 4, and is provided with a plurality of inwardly disposed pins 5. The number of pins 5 will depend largely upon the size of the rim, usually three being sufficient. The inner member or ring 1 is provided with a plurality of L-shaped slots 6 corresponding in number and position with the pins 5 so as to cooperate therewith. The slots 6 open through a side of the ring and the opposite side is provided with an outwardly disposed flange 7 and between the flanges 3 and 7 is confined the tire when mounted upon the rim. The member 1 fits easily within the member 2 and receives a lateral movement when placed in position or removed from the member 2. After the member 1 has been placed within the member 2, the two members or rings are relatively rotated to cause the pins 5 to enter the circumferential portion of the slots 6. Dogs 8 pivoted at one end to the inner side of the member or ring 1 are adapted to engage the projecting ends of the pins 5 and lock the members or rings against circumferential movement. The dogs 8 have a notch 9 at one edge in which is received a pin 5. The walls of the notch 9 flare outwardly, as indicated at 10 and 11, to form cams which cooperate with a pin 5 to move the rings 1 and 2 circumferentially in each direction. Each of the dogs 8 is pivoted at 12 adjacent the notch 9. The cam 11 operates to move the rings circumferentially and laterally, whereas the cam 10 drives the pin 5 into the circumferential portion of the slot 6. It is observed that the members or rings are continuous, hence are not liable to become distorted and render the operation of assembling and separating the rings difficult, as would be the case if either one of the rings were split or expansible. To receive the valve stem of a tire mounted upon the rim, the inner member or ring 1 is provided with an L-shaped slot 6ª and the outer member or ring 2 is provided with an opening 6ᵇ.

What is claimed is:

1. A demountable rim comprising solid or continuous rings disposed one within the other, the inner ring having a plurality of L-shaped slots and the outer ring having inwardly disposed pins coacting with said slots, and dogs pivoted to the slotted ring and having a lateral notch in an edge which flares outwardly to form cams which are adapted to engage the projecting ends of the pins and move the rings circumferentially in opposite directions.

2. A demountable rim comprising solid or continuous rings disposed one within the other, the inner ring having a plurality of L-shaped slots and the outer ring having inwardly disposed pins coacting with said slots, and dogs pivoted to the slotted ring and having a lateral notch in an edge which flares outwardly to form cams which are adapted to engage the projecting ends of the pins and move the rings circumferentially, and one of the cams further operating to move the rings laterally, said dogs locking the rings when assembled.

In testimony whereof I affix my signature in presence of two witnesses.

GEORGE G. NEISH.

Witnesses:
JOE G. LOBB,
ANDREW R. NEISH.